Nov. 26, 1968

L. A. HANSEN 3,412,879

SIDE TILT STRUCTURE FOR A CAR UNLOADER APPARATUS

Filed Nov. 23, 1966

INVENTOR
LYLE A. HANSEN
BY
Rudolph L. Lowell
ATTORNEY

Nov. 26, 1968     L. A. HANSEN     3,412,879
SIDE TILT STRUCTURE FOR A CAR UNLOADER APPARATUS
Filed Nov. 23, 1966     5 Sheets-Sheet 2

INVENTOR
LYLE A. HANSEN
BY
ATTORNEY

Nov. 26, 1968   L. A. HANSEN   3,412,879
SIDE TILT STRUCTURE FOR A CAR UNLOADER APPARATUS
Filed Nov. 23, 1966   5 Sheets-Sheet 4

INVENTOR
LYLE A. HANSEN
BY
ATTORNEY

Nov. 26, 1968 L. A. HANSEN 3,412,879
SIDE TILT STRUCTURE FOR A CAR UNLOADER APPARATUS
Filed Nov. 23, 1966 5 Sheets-Sheet 5

INVENTOR
LYLE A. HANSEN
BY
ATTORNEY 3,412,879
SIDE TILT STRUCTURE FOR A CAR
UNLOADER APPARATUS
Lyle A. Hansen, Des Moines, Iowa, assignor to Straight
Engineering Company, Adel, Iowa, a corporation of
Iowa
Filed Nov. 23, 1966, Ser. No. 596,560
12 Claims. (Cl. 214—52)

This invention relates generally to a car unloading apparatus for unloading bulk material such as grain from boxcars wherein the boxcar is both side and end tilted during an unloading operation and in particular to the structure for side tilting the boxcar.

Apparatus for unloading a boxcar by end and side tilting of the car generally includes a car supporting platform or frame which is end tilted about a transverse axis and side tilted about a fixed longitudinal axis. An unloader of this general type is disclosed in Patent 2,786,586. The unloading of the car involves the end tilting of the car in opposite directions while the car is in a side tilted position so that the bulk material is directed into a receiving pit that is adjacent to the lower side of the car. In such an unloading operation it is desirable that the car in a side tilt position assume an angle of about fifteen to eighteen degrees with respect to the horizontal.

In the present invention a car supporting or upper frame is associated with a base or lower frame such that the two frames are end tilted as a unit assembly and with the upper frame being movably supported on the lower frame for tiltable movement relative to the lower frame through a translatory pivotal and transverse movement that provides for the tilting of the car about an axis which is substantially at the level of the car floor and located substantially in the vertical plane of the rail at the side of the car to be lowered.

It is an object of this invention, therefore, to provide an improved side tilt structure for a car unloader apparatus.

A further object of this invention is to provide a side tilt structure for a car unloader apparatus wherein the car is side tilted about an axis located substantially at the level of the car floor and in a vertical plane adjacent to the vertical plane of the rail at the side of the car to be lowered, whereby side tilting of the car takes place with a minimum of vertical lifting of the car.

Still another object of this invention is to provide a side tilt structure for a car unloader apparatus capable of side tilting a car with a minimum vertical raising of the car while maintaining the center of gravity of the car in a tilted position adjacent the vertical plane of the rail at the side of the car to be lowered.

Still another object of this invention is to provide a side tilt structure for a car unloader apparatus which is operable to side tilt the car about an axis located substantially at the level of the car floor and adjacent the vertical plane of the rail at the side of the car to be lowered whereby side tilting of the car takes place efficiently and smoothly with a minimum of power and with a transverse shifting of the center of gravity of the car to a position substantially within such vertical plane.

Further objects, features and advantages of this invention will become apparent from the following description when taken in connection with the accompanying drawings, in which.

Figure 1:
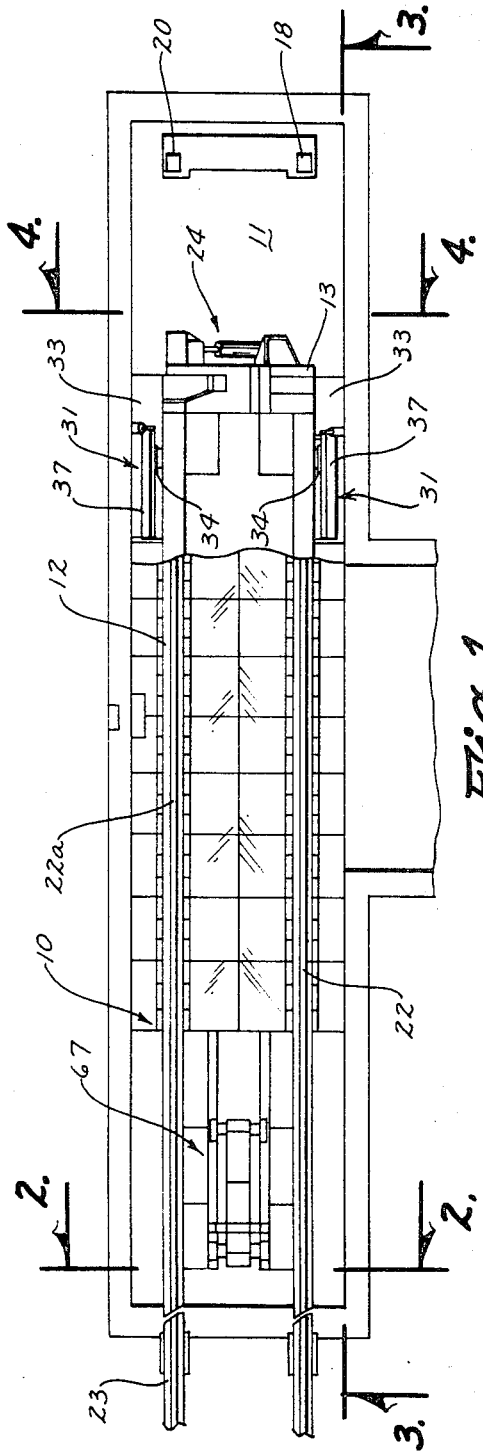
FIG. 1 is a plan view of a car unloader embodying the side tilt structure of this invention, with parts broken away to more clearly show its construction.
Figure 3:
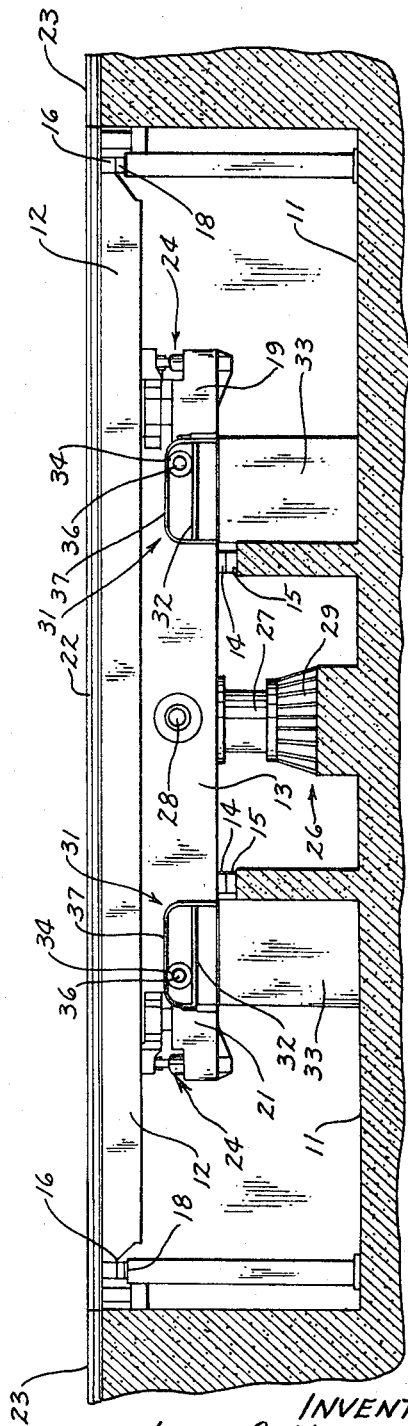
FIG. 3 is a side elevational view of the car unloader shown in FIG. 1 taken along the line 3—3 in FIG. 1.

Referring to FIGS. 1 and 3 of the drawings there is illustrated a boxcar unloader, indicated generally at 10, located within a floor pit 11 and including a boxcar supporting platform or upper frame 12 and a base or lower frame 13. The unloader 10 is shown in a car receiving position wherein bearing members 14 on the lower frame 13 are supported on foundation bearing members 15 and the upper frame 12 is superposed on the lower frame 13 in a parallel relation therewith with end bearing members 16 and 17 thereon (FIGS. 2 and 3) supported on foundation bearing members 18 and 20, respectively. The upper frame 12 (FIG. 3) is of a greater length than the lower frame 13 which is located centrally of and below the frame 12. Tracks or rails 22 and 22a for supporting a boxcar are arranged on the top surface of the upper frame 12 in linear alignment with rails 23 located at opposite ends of the pit 11 so as to provide for a boxcar being moved in one direction on and off the car unloader 10.

The frames 12 and 13 are connected together by a pair of side tilt structures 24 of this invention with a side tilt structure being located at each end of the lower frame 13. When the frames 12 and 13 are in their superposed relation shown in FIGS. 1 and 3 they are end tilted as a unit by a lift cylinder assembly 26 of hydraulic type having a lift piston 27 pivotally connected to a transverse shaft 28 mounted centrally on the lower frame 13. In an end tilting operation one end of the upper frame 12 is movably supported for horizontal movement transversely of the lower frame 13 to permit the raising of the other end of the upper frame 12 in response to the upward extension of the lift piston 27.

For this purpose a pair of transversely opposite guide units 31 (FIGS. 1, 3 and 4) are arranged to the opposite sides of and at each end of the lower frame 13. Each guide unit 31 includes a longitudinally extended track member 32 laterally spaced from the lower frame 13 and suitably supported on an upright foundation 33 located in the pit 11. Rideable on each track member 32 is a flanged wheel 34 which is carried on a transverse shaft 36 mounted on the lower frame 13. A movable yoke member 37 vertically spaced above and coextensive in length with each track member 32 is engageable with the top side of a corresponding wheel 34 to hold the wheel against upward movement.

In an end tilting operation the yoke members 37 at the end of the frame 13 to be raised, are moved out of an engaged position with their associated wheels 34 while the yoke members 37 at the opposite end of the frame 13 are retained in engagement with their associated wheels. An end tilting of the frames 12 and 13 as a unit is thus positively obtained by the rolling support of the lower end of the frame 13 within the closed guide units 31. For a more detailed description of the cooperative action of the lift piston 27 and guide units 31 for end tilting the frames 12 and 13, reference is made to Patent 2,786,586.

Each side tilt structure 24 (FIGS. 5 and 6) includes a linearly extendible power means 38 illustrated as a double acting hydraulic cylinder assembly that includes a cylinder 39 and a piston rod 41. The cylinder assembly 38 is inclined upwardly and transversely of the frames 12 and 13 in a direction toward the side 42 of the upper frame 12 which is to be raised in a side tilting operation. The closed or lower end of the cylinder 39 is pivotally supported on a pin 43 carried in spaced ear or lug members 44 which depend from the lower frame 13. The free end of the piston rod 41 is pivotally connected by a pin 46 mounted in a pair of ears or lugs 47 which are secured to the underside of the upper frame 12 at the side 42 thereof which is to be raised.

Figure 4:
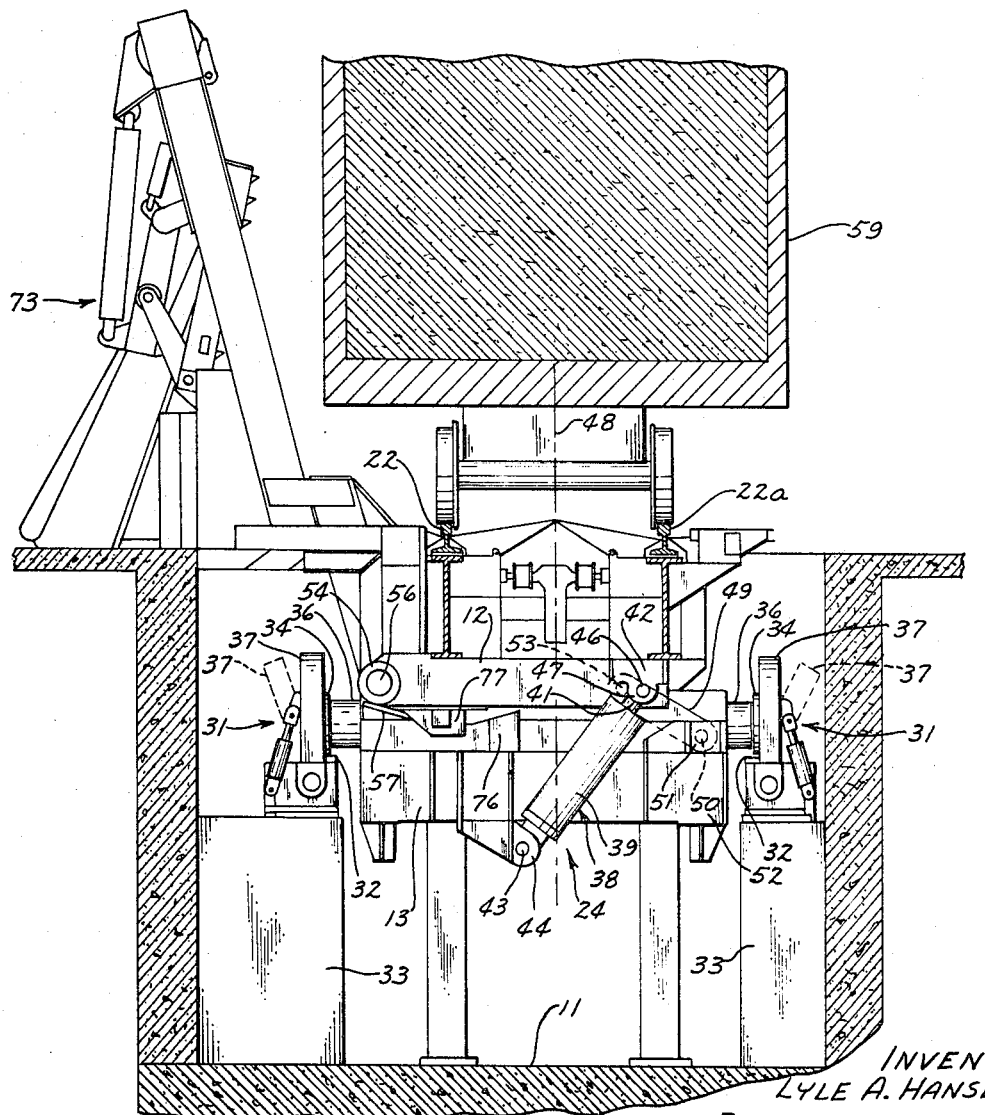
FIG. 4 is an enlarged sectional view of the car unloader taken substantially along the line 4—4 in FIG. 1 showing a side tilt structure in side elevation, with a boxcar in a position to be side tilted and a door breaker for the boxcar being also illustrated.
Figure 5:
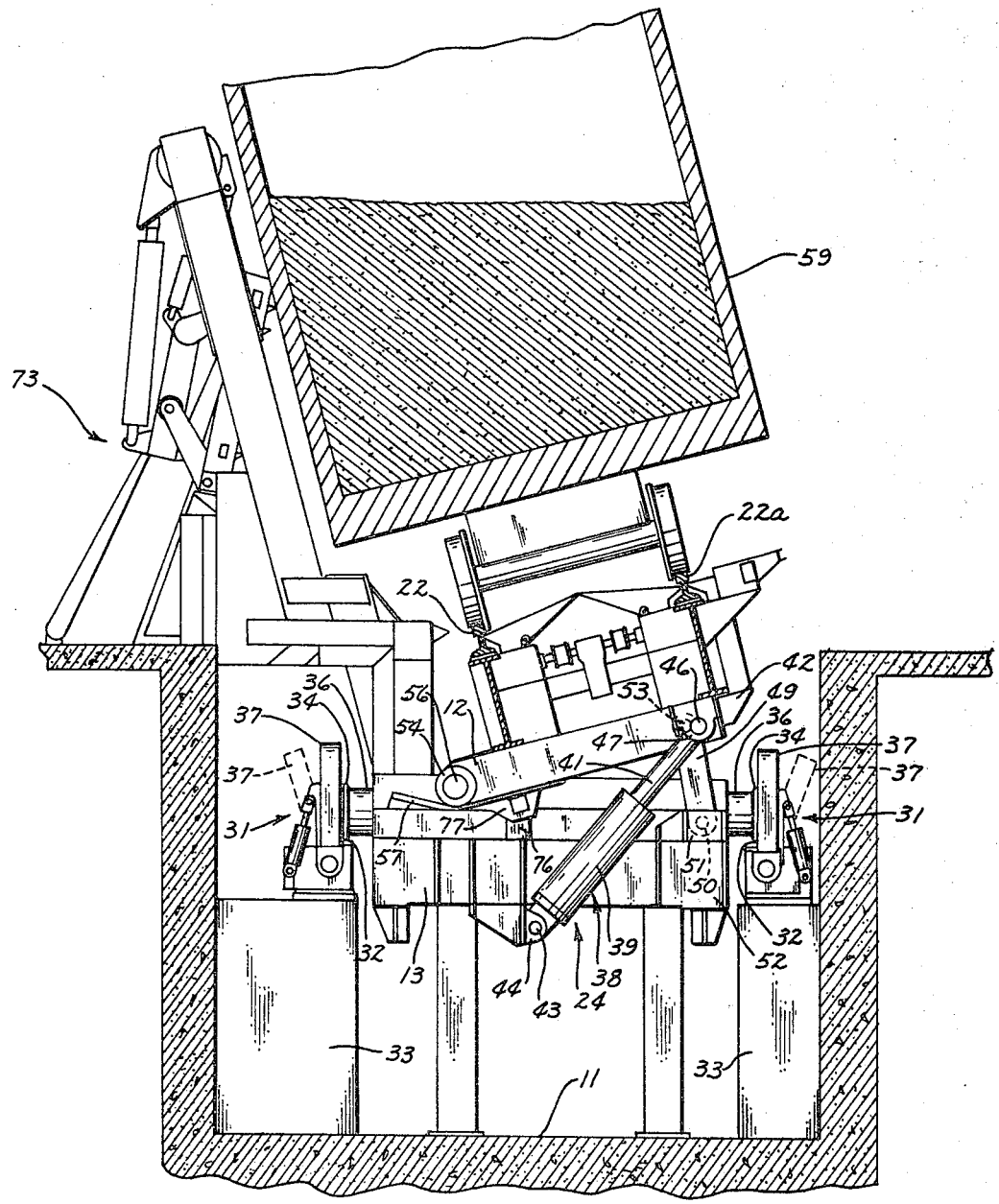
FIG. 5 is illustrated similarly to FIG. 4 and shows the side tilt structure in changed position to tilt the boxcar.
Figure 6:
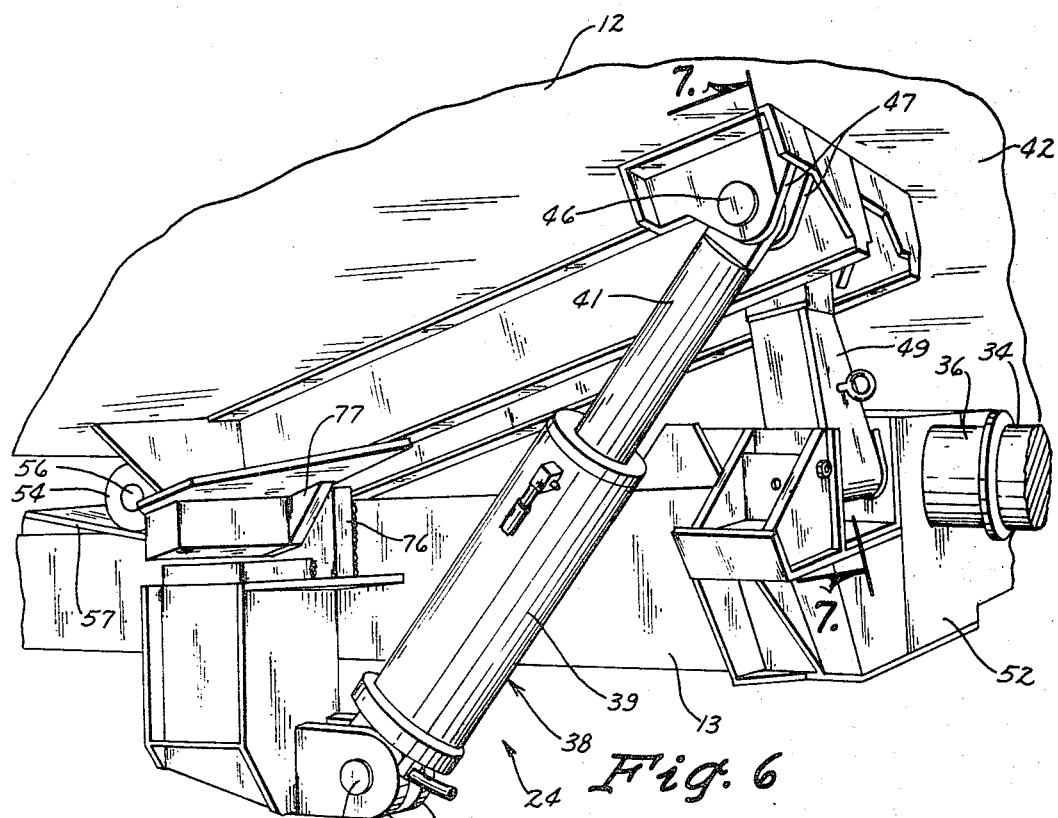
FIG. 6 is an enlarged perspective view showing the side tilt structure in assembly relation with the upper and lower frames of the car unloader and with the upper frame in a tilted position relative to the lower frame.

As clearly appears in FIG. 4 the cylinder assembly 38 intersects a vertical plane, indicated at 48, which extends through the longitudinal center lines of the frames 12 and 13 so that the pivot support 43 for the cylinder 39 and the pivot connection 46 of the piston rod 41 are located at opposite sides of the plane 48. A guide link or lever 49 (FIGS. 6 and 7), reversely inclined relative to the hydraulic cylinder assembly 38, has a lower end pivotally connected on a shaft 50 extended longitudinally of and mounted in bearing supports 51 on the upper side of the lower frame 13 at the side 52 thereof corresponding to the liftable side 42 of the upper frame 12. The upper end of a lever 49 is pivotally connected to a shaft 53 carried in journals 55 on the underside of the upper frame 12 at a position adjacent to the pivotal connection 46 of the piston rod 41 (FIGS. 4 and 5). A lever 49 extends transversely of the frames 12 and 13 in a parallel spaced relation with an associated hydraulic cylinder assembly 38.

A roller 54 for each side tilt structure 24 (FIGS. 4 and 6) is rotatably supported on a longitudinally extended shaft 56 supported from the underside of the upper frame 12 at the side thereof which remains lowered during a side tilting operation. Each roller 54 is located transversely opposite a corresponding lever 49 and is rideable on a transversely extended flat track 57 mounted on the top side of the lower frame 13 and inclined downwardly and inwardly of the frame 13 at an angle of about fifteen degrees.

On extension of the piston rod 41 from the cylinder 39 to side tilt the upper frame 12 relative to the lower frame 13 to an angle of about fifteen degrees the free end of the piston rod 41 moves upwardly in a path which conforms substantially to the arcuate path defined by the movement of the upper end of a lever 49 about the pivotal connection 51 at the lower end thereof. By virtue of a lever 49 being pivotally interconnected with the frames 12 and 13 the upper frame 12 is thus guided to move transversely of the lower frame 13 concurrently with a pivotal raising of its liftable side 42. This translatory pivotal and transverse movement of the upper frame 12 relative to the lower frame 13 is accomplished by virtue of the roller support of its lower side on the inclined track members 57. In other words a roller 54 and an associated track member 57 constitutes a transversely movable fulcrum or pivot for the upper frame 12.

Figure 8:
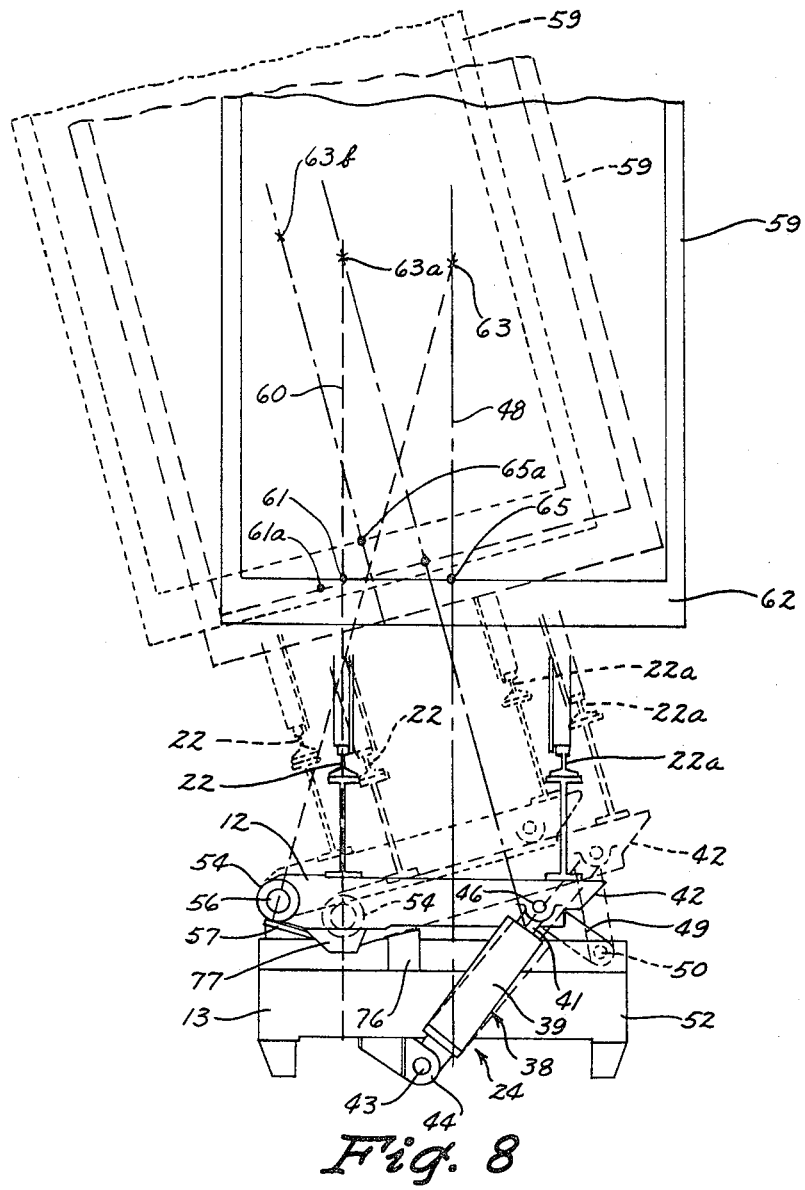
FIG. 8 is a diagrammatical side elevational view of the side tilt structure showing the path of movement taken by a boxcar when tilted by the side tilt structure of this invention and the path of movement of a boxcar when pivoted about a fixed axis.

As a result of this translatory transverse and pivotal movement of the upper frame 12 relative to the lower frame 13 a boxcar, as shown in FIG. 8, is capable of being side tilted to an angle of about fifteen degrees with respect to a horizontal plane about a longitudinal axis, indicated at 61, located substantially at the level of the car floor 62 and substantially within a vertical plane 60 common to the vertical plane of the rail 22 at the side of the car to be lowered.

The phrase "substantially at the level of the car floor 62" as employed herein is to define either coincidence or a vertically offset relation with the car floor. Likewise the language "substantially within" or "adjacent to" the vertical plane 60 is used to define either conicidence or an offset relation with the vertical plane 60.

As shown in full lines in FIG. 8 the boxcar 59 is in its normal or rest position on the rails 22 and 22a of the upper frame 12. In this normal position of the car 59 its center of gravity, indicated at 63, is located in the vertical plane 48 extended midway between the rails 22 and 22a. On actuation of the side tilt structures 24 to their positions for side tilting the upper frame 12 and in turn the boxcar 59 to an angle of about fifteen degrees relative to a horizontal plane, as indicated in dash lines in FIG. 8, the longitudinal axis 61 is moved to a position indicated at 61a. In turn the center of gravity of the car 59 is moved from its position at 63 to a position indicated at 63a within the vertical plane 60. It is to be also noted that in a side tilted position of the boxcar 59 a roller 54 is moved transversely of the lower frame 13 to the lower end of a corresponding inclined track member 57 wherein its axis of rotation is substantially in the plane 60 and in vertical alignment with the center of gravity 63a.

The greater portion of the load in the boxcar 59 is thus applied directly to the rollers 54 to provide for a self-locking of the tilt structures 24 when in a side tilting position. In other words the applied load holds the rollers 54 against travel upwardly of the track members 57 so that this upward travel takes place only in response to a retraction of the piston rod 41 within its associated cylinder 39.

Illustrated in dotted lines in FIG. 8 is a side tilted position of the boxcar 59 as provided by eliminating the levers 49 and retaining the rollers 54 fixed in their full line positions shown in FIG. 8. With the axes of the rollers 54 thus functioning as fixed pivots for the upper frame 12 it is seen that pivotal movement of the frame 12 to an angle of about fifteen degrees relative to the lower frame 13 moves the longitudinal center line of the car 59 from its position indicated at 65 to a position shown at 65a. A corresponding movement of the center of gravity of the car 59 takes place from its position 63 to the position indicated at 63b to the left of the vertical plane 60, as viewed in FIG. 8.

It is seen, therefore, that with the car 59 tilted about a fixed axis that the vertical lift thereof to an angle of about fifteen degrees is substantially double the vertical lift effected by the side tilt structures 24 of this invention coupled with an appreciable lateral or transverse shifting of the floor center line 65 and sifting of the center of gravity 63 out of the plane 60.

It is to be also noted that although the side tilt structures 24 at each end of the lower frame 13 are operated concurrently from a common source of fluid pressure that no mechanical connection is required therebetween to synchronize their lifting action in tilting the upper frame 12. Any variations in the relative lifting movement of the piston rods 41 to tilt the upper frame 12 is accommodated by the shafts 53 (FIG. 7) being connected to the upper ends of the guide levers 49 through self-aligning bearing members 65. Tilting of the upper frame 12, therefore, takes place without effecting therein any appreciable torsional or twisting moments.

In the operation of the car unloader 10, and with the unloader in its position shown in FIG. 1, the boxcar 59 is moved into position on the rails 22 and 22a of the upper frame 12 and is then secured thereto by a pair of movable car clamp units 67, only one of which is illustrated in FIG. 1. With the car centered longitudinally of the upper frame 12 a car clamp unit 67 is connected with the usual coupler at each end of the car to hold and lock the car coupler against longitudinal and transverse movements. For a detailed description of a car clamp unit 67 reference is made to Patent 3,004,499.

The boxcar 59 thus secured to the upper frame 12 is then side tilted by operation of the side tilt structures 24. As a result of the translatory pivotal and transverse movement of the frame 12 relative to the lower frame 13 the bearing members 16 and 17 (FIG. 2) at each end of the upper frame 12 are moved upwardly out of engagement with and to one side of their associated foundation bearing members 18 and 20, respectively. With the bearing members 16 and 17 thus clear of the foundation bearing members 18 and 20, for relative vertical movement, the car 59 is end tilted by the cooperative action of the lift piston 27 and guide units 31. A door breaking mechanism, such as shown at 73 in FIGS. 4 and 5 and located outside of the pit 11 at a position adjacent to the lower side of the car 59, is operated to break the usual grain door on the car 59 to provide for the unloading of the grain into the pit 11.

When the grain has been removed from the raised end of the car 59 the car is reversely end tilted to unload the opposite end thereof. Additional end tilting may be required as needed to substantially empty the car. The lower frame 13 is then returned to its normal horizontal position and the upper frame 12 is lowered from its car side tilting position. With the car clamp units 67 disconnected from the car couplers and returned to their normal rest positions the car 59 is moved off of the unloader 10.

Figure 2:
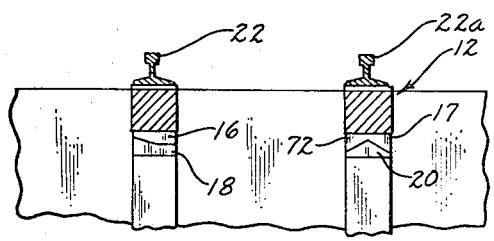
FIG. 2 is an enlarged sectional detail view as seen on the line 2—2 in FIG. 1.

As shown in FIG. 2 the bearing members 16 and 18 have reversely inclined bearing surfaces. The bearing members 20 are of an inverted V-shape to engage in a mating relation the V-shaped bearing members 72. When the upper frame 12 is in a side tilted position the bearing members 16 and 17 are located upwardly from and to the right of their corresponding foundation bearing members 18 and 20 as viewed in FIG. 2. On lowering of the upper frame 12 to the horizontal position therefor, in response to retraction of the cylinder assemblies 38 of the side tilt structures 24, the frame 12 follows a translatory pivotal and transverse path of movement whereby the bearing members 16 and 18, and 17 and 20, are moved into mating engagement. When the bearing members are thus engaged the upper frame 12 is locked against transverse movement relative to the lower frame 13. It is to be understood that concurrently with the mating engagement of the bearing members 16 and 18, and 17 and 20, that the bearing members 14 on the lower frame 13 are moved into engagement with their associated foundation bearing members 15. Since the rollers 54 are at all times in engagementment with the track members 57 it is seen that the lower frame 13 in its horizontal position is supported on the tracks 32 of the guide units 31 and on the foundation bearing members 15, and that the upper frame 12 in its horizontal position is supported on the track members 57 and foundation bearing members 18 and 20.

With the upper frame 12 in a side tilted position, and when end tilting thereof takes place, the upper frame tends to move longitudinally relative to the lower frame 13. To preclude this relative movement, and as best appears in FIGS. 4 and 6, the lower frame 13 carries at each end thereof an upright bearing or thrust plate 76 for coacting engagement with a dependent bearing plate 77 on the upper frame 12. The coacting plates 76 and 77 are relatively arranged transversely of the frames 13 and 12, respectively, so that on tilting movement of the frame 12 the inner surface of the plate 77 is progressively moved into contact engagement with the outer surface of the plate 76 so that the plates 76 and 77 are in full contact engagement when the frame 12 is in a fully tilted position.

Figure 7:
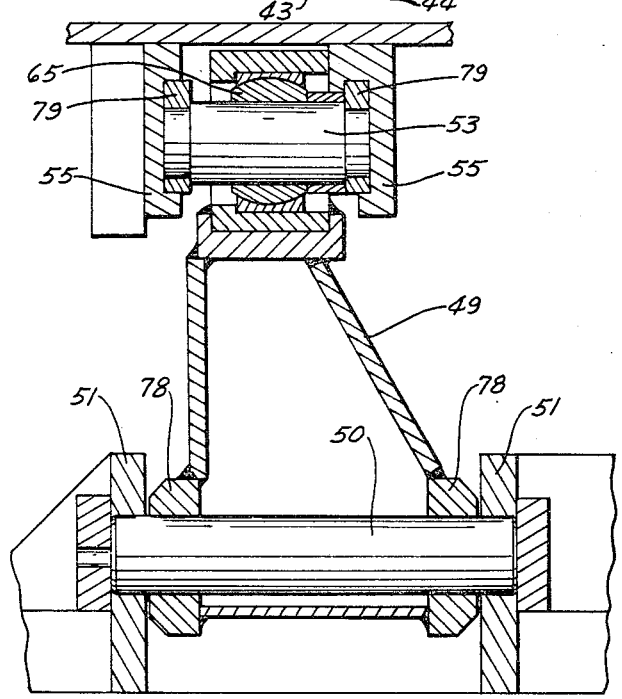
FIG. 7 is an enlarged detail sectional view taken on the line 7—7 in FIG. 6.

Also as shown in FIG. 7 the pivot shaft 50 for the lower end of a guide lever 49 is provided with thrust collars 78 that are engageable with the bearing supports 51 for the shaft 50. Likewise it is seen that the shaft 53 for pivotally connecting the upper end of a guide lever 49 with the upper frame 12 is carried in thrust bearings 79.

It is seen therefore that the side tilt structure 24 of this invention is of a compact construction capable of being readily assembled with the frames 12 and 13 within small space requirements and operable with low power requirements to smoothly and positively side tilt a boxcar 59 on the frame 12 about an axis substantially coincident with the longitudinal center line of the car floor. Side tilting of the car 59 thus takes place with a minimum of vertical lifting and transverse movement of the car. Although the side tilt structures 24 are operated concurrently a synchronized operation thereof is eliminated by virtue of the roller and track assemblies 54–57 which provide a transversely movable fulcrum support for the upper frame 12 on the lower frame 13.

Although the invention has been described with respect to a preferred embodiment thereof it is to be understood that it is not to be so limited since changes and modifications can be made therein which are within the full intended scope of the invention as defined in the appended claims.

I claim:

1. In a car unloader apparatus having a lower frame and an upper frame for carrying a car in a secured position thereon wherein said two frames are end tilted together and said upper frame is side tilted relative to said lower frame:
   (a) means for side tilting said upper frame relative to said lower frame including,
   (b) a linearly extendible power means at each end of the lower frame inclined upwardly in a direction toward one side of the upper frame,
   (c) means pivotally supporting the lower end of each power means on said lower frame,
   (d) a lever arm corresponding to each power means having one end pivotally connected to the lower frame at the side thereof below the one side of said upper frame and reversely inclined relative to a corresponding power means,
   (e) first pivot means pivotally connecting the opposite ends of said lever arms to said upper frame,
   (f) second pivot means pivotally connecting the opposite ends of said power means to said upper frame at positions adjacent to said first pivot means,
   (g) a roller member corresponding to each power means rotatably mounted on the upper frame on the side opposite the one side thereof, and
   (h) a transversely extended track means of each roller member mounted on the lower frame, each roller member being in continuous engagement with a corresponding track means whereby on operation of said power means said upper frame is moved transversely of said lower frame concurrently with the pivotal raising and lowering of the one side thereof from a first position wherein said two frames are in a superposed parallel relation to a second position wherein said upper frame is tilted upwardly from said lower frame.

2. In a car unloader apparatus having a lower frame and an upper frame for carrying a car in a secured position thereon and wherein said two frames are end tilted together and said upper frame is side tilted relative to said lower frame:
   (a) means for side tilting said upper frame relative to said lower frame including,
   (b) a pair of structures for side tilting said upper frame spaced longitudinally of said lower frame with each thereof including a linearly extendible power means, pivotally supported at one end on said lower frame and inclined upwardly for pivotal connection of the opposite end thereof adjacent the side of the upper frame to be raised,
   (c) a pivoted lever for each of said structures inclined reversely relative to a corresponding power means and pivotally connected at one end to said upper frame adjacent the pivotal connection of said power means, with the opposite end thereof pivotally supported on said lower frame, and (d) coacting means on said lower frame and said upper frame movably supporting the opposite side of the upper frame on said lower frame for translatory and pivotal movement of said upper frame relative to said lower frame in response to the extension and retraction of said power means.

3. In a car unloader apparatus as defined in claim 2 wherein:
  (a) the pivotal support and pivotal connection of each power means are located to opposite sides of the longitudial center line of said upper frame.

4. In a car unloader apparatus as defined in claim 2 wherein said coacting means includes:
  (a) a roller member corresponding to each power means rotatably supported for rotation about an axis extended longitudinally of said upper frame, with each roller member located at the opposite side of said upper frame at a position transversely opposite a corresponding pivoted lever, and
  (b) a track means engageable with each roller extended transversely of said lower frame.

5. In a car unloader apparatus is defined in claim 4 wherein:
  (a) each track means is inclined downwardly and inwardly of the lower frame to provide for an automatic locking of the upper frame in a side tilted position therefor.

6. In a car unloader apparatus having a lower frame and an upper frame for carrying a car in a secured position thereon wherein said two frames are end tilted together about a common transverse axis and said upper frame is side tilted relative to said lower frame:
  (a) means for side tilting said upper frame relative to said lower frame including,
  (b) linearly extendible power means extended between and pivotally connected to said two frames,
  (c) lever means extended between and pivotally connected to said two frames to provide for a translatory pivotal and transverse movement of the upper frame relative to said lower frame in response to retraction and extension of said power means, and
  (d) coacting means on said two frames constituting a tranversely movable fulcrum support for the side of the upper frame opposite the side thereof which is raised and lowered by said translatory movement.

7. In a car unloader apparatus according to claim 6 wherein:
  (a) said power means and said lever means are reversely inclined relative to each other with said power means inclined upwardly toward the side of the upper frame that is raised and lowered by said translatory movement.

8. In a car unloader according to claim 6 wherein:
  (a) said coacting means includes roller members supported on said upper frame for rotation about an axis extended longitudinally thereof, and
  (b) transversely extended track means for said roller members mounted on said lower frame.

9. In a car unloader apparatus according to claim 6 including:
  (a) coacting thrust bearing portions on said two frames engageable during said translatory movement to hold the upper frame against longitudinal movement relative to said lower frame.

10. In a car unloader apparatus having a lower frame and an upper frame for carrying a car in a secured position thereon wherein said two frames are end tilted together about a common transverse axis and said upper frame is side tilted relative to said lower frame:
  (a) means for side tilting said upper frame relative to said lower frame so that the car is tilted about an axis located substantially at the level of the car floor and in a vertical plane adjacent to the vertical plane of the rail at the side of the car to be lowered including,
  (b) coacting means on said two frames constituting a transversely movable fulcrum support for the side of the upper frame opposite the side thereof which is raised and lowered, and
  (c) means interconnected between said two frames to provide for a translatory pivotal and transverse movement of the upper frame relative to said lower frame.

11. In a car unloader apparatus according to claim 10 wherein said interconnected means includes:
  (a) linearly extendible power means extended between and pivotally connected to said two frames, and
  (b) lever means extended between and pivotally connected to said two frames,
  (c) said power means inclined upwardly toward the side of the upper frame which is to be raised and lowered.

12. In a car unloader apparatus according to claim 10 including:
  (a) coacting thrust bearing portions on said two frames engageable during said translatory movement to hold the upper frame against longitudinal movement relative to said lower frame.

References Cited

UNITED STATES PATENTS

| | | | |
|---|---|---|---|
| 1,938,027 | 12/1933 | Kidder | 214—47 |
| 2,786,586 | 3/1957 | Hague et al. | 214—46.3 |
| 2,786,587 | 3/1957 | Straight | 214—46.3 X |

ROBERT G. SHERIDAN, *Primary Examiner.*